US007924441B1

(12) United States Patent
Milanović

(10) Patent No.: US 7,924,441 B1
(45) Date of Patent: Apr. 12, 2011

(54) FAST AND HIGH-PRECISION 3D TRACKING AND POSITION MEASUREMENT WITH MEMS MICROMIRRORS

(75) Inventor: Veljko Milanović, El Cerrito, CA (US)

(73) Assignee: Mirrorcle Technologies, Inc., Albany, CA (US)

( * ) Notice: Subject to any disclaimer, the term of this patent is extended or adjusted under 35 U.S.C. 154(b) by 0 days.

(21) Appl. No.: 12/538,093

(22) Filed: Aug. 7, 2009

Related U.S. Application Data

(60) Provisional application No. 61/087,604, filed on Aug. 8, 2008.

(51) Int. Cl.
*G01B 11/14* (2006.01)
(52) U.S. Cl. .................. 356/614; 250/559.29; 250/342; 250/559.37; 356/623; 356/3.01; 356/139.08
(58) Field of Classification Search .................. 250/342, 250/559.29, 559.31, 559.32, 559.33, 559.37, 250/559.38; 356/614, 615, 623, 138, 139–139.08, 356/140, 141.1–141.5, 152.1, 152.2, 3.01–3.123
See application file for complete search history.

(56) References Cited

U.S. PATENT DOCUMENTS

| | | | |
|---|---|---|---|
| 4,492,465 A | 1/1985 | Erdmann et al. | |
| 4,838,696 A | 6/1989 | Pryor | |
| 5,305,091 A | 4/1994 | Gelbart et al. | |
| 6,311,894 B1 | 11/2001 | Miyajima et al. | |
| 7,078,672 B2 | 7/2006 | Xie et al. | |
| 7,184,022 B2 | 2/2007 | Xie et al. | |
| 7,295,726 B1 | 11/2007 | Milanovic et al. | |
| 7,359,041 B2 * | 4/2008 | Xie et al. ................. | 356/139.04 |
| 7,428,353 B1 | 9/2008 | Milanovic et al. | |
| 2008/0061026 A1 | 3/2008 | Milanovic et al. | |
| 2010/0008588 A1 * | 1/2010 | Feldkhun et al. ............. | 382/206 |

OTHER PUBLICATIONS

V. Milanovic, D.T. McCormick, G. Matus, "Gimbal-less Monolithic Silicon Actuators for Tip-Tilt-Piston Micromirror Applications", IEEE J. of Select Topics in Quantum Electronics, vol. 10, Issue: 3, May-Jun. 2004, pp. 462-471.
J. Brophy-Warren, "Magic Wand: How Hackers Make Use of Their Wii-motes," The Wall Street Journal, Apr. 28, 2007 download from http://www.discussanything.com/forums/showthread.php?t=103730 on Sep. 14, 2010.

(Continued)

*Primary Examiner* — Gregory J Toatley
*Assistant Examiner* — Iyabo S Alli
(74) *Attorney, Agent, or Firm* — JDI Patent; Joshua D. Isenberg

(57) ABSTRACT

An optical locating and tracking system may have two or more optical scanners, one or more optical detectors responsive to radiation from one or more optical sources, and a controller coupled to the detector(s) and the scanner(s). Each scanner has a reflector mounted to a two-dimensional actuator that tilts the reflector about first and second axes. The controller determines whether a given reflector of a given scanner is aligned to provide an optical path between the optical source(s) and the detector(s) from one or more detection signals from the one or more optical detectors. The optical path originates, terminates or is deflected at the object. The controller also determines the object's position in three dimensions from control signals to the two-dimensional actuators of the scanners obtained the reflectors are aligned to provide the optical path. The control signals determine a tilt of each reflector about its first and second axes.

26 Claims, 14 Drawing Sheets

OTHER PUBLICATIONS

P. Arcara, et al, "Perception of Depth Information by Means of a Wire-Actuated Haptic Interface," Proc. of 2000 IEEE Int. Conf. On Robotics and Automation, Apr. 2000.

A. Cassinelli, et al, "Smart Laser-Scanner for 3D Human-Machine Interface," Int. Conf. on Human Factors in Computing Systems, Portland, OR, Apr. 2-7, 2005, pp. 1138-1139.

S. Perrin, et al, "Laser-Based Finger Tracking System Suitable for MOEMS Integration," Image and Vision Computing, New Zealand, Nov. 26-28, 2003, pp. 131-136.

F. Blais, J.-A. Beraldin, S. El-Hakim, and L. Cournoyer, "Comparison of Pose Estimation Methods for a 3D Laser Tracking System using Triangulation and Programmetry Techniques," SPIE Proceedings, Electronic Imaging 2001, Videometrics and Optical Methods for 3D Shape Measurement VII, San Jose, CA. Jan. 21-26, 2001.

V. Milanović, W. K. Lo, "Fast and High-Precision 3D Tracking and Position Measurement with MEMS Micromirrors", 2008 IEEE/LEOS International Conference on Optical MEMs and Nanophotonics, ISBN: 978-1-4244-1917-3, pp. 72-73, Freiburg, Germany, Aug. 11-14, 2008.

U.S. Appl. No. 61/087,604, filed Aug. 8, 2008.
U.S. Appl. No. 60/526,510, filed Dec. 2, 2003.
U.S. Appl. No. 12/781,766, filed May 17, 2010.

* cited by examiner

Photo Detector

Light Sources 14B
14A
15A
15A

Scanning Mirror  Scanning Mirror
Searching Mode

Photo Detector

Lasers 14B
14A
15A
15A

Tracking Mode

The reflected light is deflected to the photo detector by a beamsplitter

Corner Cube Reflector
or
Retro-reflector (a)
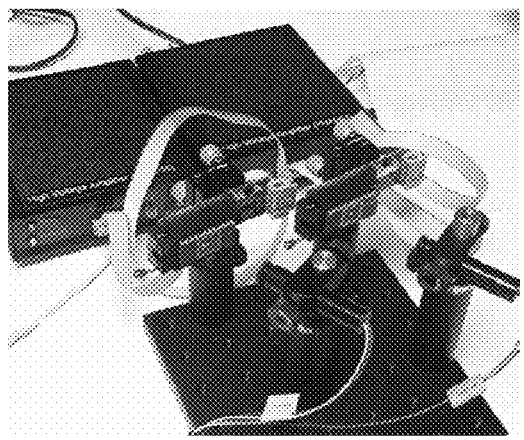 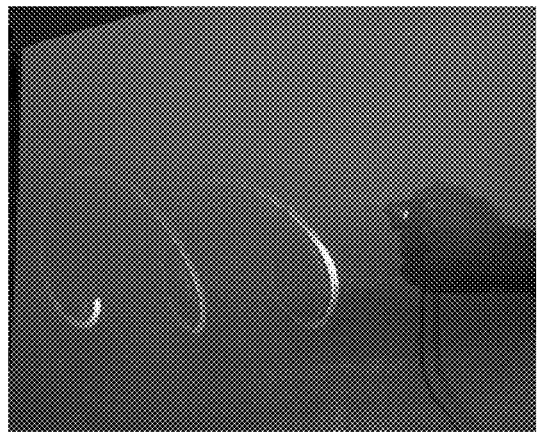
FIG. 13A          FIG. 13B
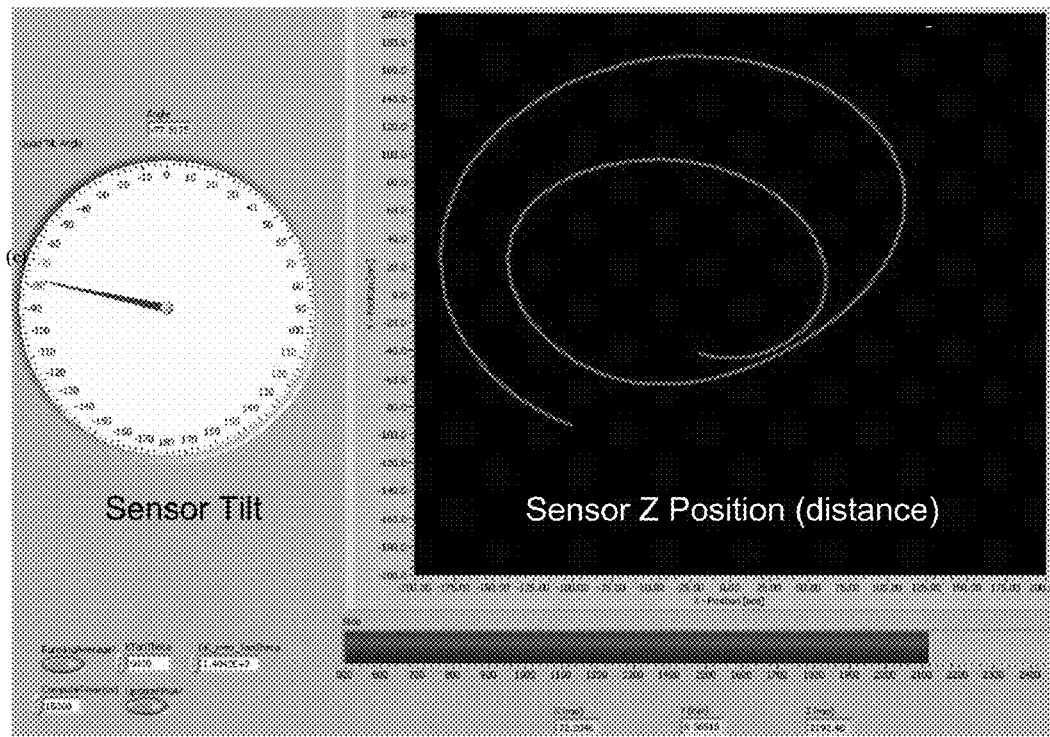
FIG. 13C

FAST AND HIGH-PRECISION 3D TRACKING AND POSITION MEASUREMENT WITH MEMS MICROMIRRORS

CLAIM OF PRIORITY

This Application claims the priority benefit of U.S. Provisional Patent Application No. 61/087,604 filed Aug. 8, 2008, the contents of which are incorporated herein by reference.

CROSS-REFERENCE TO RELATED APPLICATIONS

This Application is related to U.S. Pat. No. 7,295,726, US Patent Application Publication number 20080061026, U.S. patent application Ser. No. 11/465,835 (now U.S. Pat. No. 7,428,353), and U.S. Provisional Patent Application No. 60/526,510, the contents of all five of which are incorporated herein by reference.

BACKGROUND OF INVENTION

Obtaining real-time 3D co-ordinates of a moving object has many applications such as gaming [1], robotics and human-computer interaction applications [2-4], industrial applications etc. Various technologies have been investigated for and used in these applications, including sensing via wire-interfaces [2], ultrasound, and laser interferometry. However a simple and low cost solution that can provide enough precision and flexibility has not been available. Recent proliferation of low-cost inertial sensors has not addressed the problem of position tracking Cassinelli et al demonstrated a scanning mirror-based tracking solution [3-4]; however their system does not solve the problem of object searching/selecting and does not have adequate depth (Z-axis) measurements.

In addition it is often desirable to obtain good resolution on the position of the object when it is close to the tracking system. Unfortunately, many existing tracking systems tend to lose resolution when the object is close in.

Many video-based tracking systems utilize charge-coupled device (CCD) arrays to obtain position information from an image of the object that is being tracked. Unfortunately, the image is two-dimensional and additional information is usually needed in order to derive three-dimensional position information. In addition, a CCD typically has a limited field of view. Furthermore, there is a large cost differential associated with increasing the resolution of CCD array.

It is within this context that embodiments of the present invention arise.

OBJECTIVES

The objective of the work that led to embodiments of the present invention was to develop and demonstrate an optical-MEMS based, very low cost and versatile platform for tracking and position measurement in a variety of situations. Use of MEMS mirrors with potential for use of wide-angle lenses provides the possibility of tracking in a very large volume, and very far distances (e.g. use of remote-control IR source-detector modules can provide a range of 50 m or more).

A brief discussion of this work is included in the abstract to a presentation for OEMEMS 2008 by Veljko Milanović entitled "Fast and High-Precision 3D Tracking and Position Measurement with MEMS Micromirrors", which is incorporated herein by reference.

SUMMARY

According to an embodiment of the present invention, a system for optically locating and tracking an object in three dimensions and measuring a position in three dimensions, may comprise two or more optical scanners, one or more optical detectors, and a controller. Each optical scanner has a reflector mounted to a two-dimensional actuator configured to control a tilt of the reflector about a first axis and a second axis. The one or more optical detectors are responsive to radiation from one or more optical sources. The controller is coupled to the one or more optical detectors and first and second optical scanners. The controller is configured to determine from one or more detection signals from the one or more optical detectors whether a given reflector of a given scanner is aligned to provide an optical path between the one or more optical sources and the one or more optical detectors. The optical path originates, terminates or is deflected at the object. The controller is also configured to determine a position of the object in three dimensions from control signals to the two-dimensional actuators of each of the two or more optical scanners obtained when each reflector is aligned to provide the optical path between the one or more optical sources and the one or more optical detectors. The control signals determine a tilt of each reflector about its first and second axes.

In some embodiments, the two or more optical scanners may include two or more MEMS optical scanners.

According to an embodiment, the one or more optical sources may include two or more distinct optical sources, wherein each optical source is optically coupled to a different one of the two or more optical scanners. In such an embodiment the one or more optical detectors may include an optical detector that either is the object or is configured to be attached to the object. In such an embodiment the two or more distinct optical sources may be distinguished by different modulation of radiation from the two or more distinct optical sources, by different wavelengths of radiation from the two or more distinct optical sources, or by time multiplexing of radiation from the two or more distinct optical sources.

In some embodiments, the one or more optical sources may include an optical source that either is the object or is configured to be attached to the object. In such a case the one or more optical detectors may include two or more optical detectors wherein each optical detector is optically coupled to a different one of the two or more optical scanners.

In some embodiments, the one or more optical sources may include two or more optical sources. Each optical source may be optically coupled to a different one of the two or more optical scanners and wherein the one or more optical detectors includes two or more optical detectors wherein each optical detector is located proximate a different one of the two or more optical scanners.

In some embodiments, the two or more scanners, one or more optical sources, one or more optical detectors and the controller may be configured such that the controller can determine angles of tilt of each reflector about its first and second axes with a resolution of greater than 10 bits.

In some embodiments, the two or more scanners, one or more optical sources, one or more optical detectors and the controller may be configured such that the controller can determine the three-dimensional position of the object at a bandwidth of 10 kilohertz or more.

In some embodiments, the controller may be configured to provide control the two-dimensional actuators of the two or more optical scanners. In such an embodiment, the controller may optionally be further configured to scan the two or more optical scanners in a spiral pattern. In such an embodiment, the controller may optionally be configured to adjust a scan of the angles of the reflectors about their first and second axes in response to the one or more detection signals. In such a case, the controller may be configured to adjust an origin of a scan to correspond to a previous known position of the object.

According to another embodiment, a method for optically locating and tracking an object in three dimensions and measuring a position in three dimensions may comprise:

a) scanning a first reflector about a first axis and a second axis;
b) scanning a second reflector about a third axis and a fourth axis;
c) generating radiation with one or more optical sources;
d) reflecting the radiation with the first and second reflectors while scanning the first and second reflectors;
e) using one or more optical detectors to determine when the first and second reflectors provide first and second optical paths between the one or more optical sources and the one or more optical detectors, wherein the optical path originates, terminates or is deflected at the object;
f) determining values of the first and second angles of rotation of the first reflector with respect to the first and second axes at a time when the first reflectors provides the first optical path;
g) determining values of the third and fourth angles of rotation of the second reflector with respect to the third and fourth axes at a time when the second reflector provides the second optical path; and
h) determining a position of the object in three dimensions from the values of the first, second, third and fourth angles.

In some versions of the above method, c) may include generating first and second distinct optical radiation signals and wherein the one or more optical detectors include an optical detector that is the object or is attachable to the object.

In other versions of the above method, c) may include generating an optical signal with a source that either is the object or is attachable to the object, wherein the one or more detectors include first and second optical detectors respectively located proximate the first and second reflectors.

In still other versions of the above method, c) may include generating first and second distinct optical radiation signals and deflecting the first and second optical radiation signals at the object. In such a case, the one or more detectors include first and second optical detectors respectively located proximate the first and second reflectors.

In some versions of the above method, a) and b) may include scanning the first and second reflectors in spiral patterns.

Some versions of the above method may further comprise adjusting the scanning of the first or second reflector in response to a determination that the first and second reflectors provide the first and second optical paths between the one or more optical sources and the one or more optical detectors. In such a version, adjusting the scanning may include adjusting an origin of the scanning of the first or second reflector to correspond to a previous known position of the object. Alternatively, the scanning may be adjusted by adjusting range of the scanning in response to the determination that the first and second reflectors provide the first and second optical paths.

BRIEF DESCRIPTION OF THE DRAWINGS

FIG. 13A is a photograph of an optical tracking system in accordance with an embodiment of the invention that utilizes two MEMS scanners and amplifiers.

FIG. 13B is 2 s long exposure photograph of quad-detector operating in a tracking mode.

FIG. 13C is a graphical user interface (GUI) screen shot capture showing four measured degrees of freedom of the detector

DETAILED DESCRIPTION

According to an embodiment of the present invention a system may be created that may be e.g. attached to a personal computer, to allow a computer to continuously monitor the 3D position of an object. The object may be held in the hand of a human user and moved about by hand in an arbitrary manner. In addition, the computer may take derivatives of the position measurement and thus obtain velocity and acceleration data of that object in 3D space. The object being waved by the user may include a photo-detector or may be one or multiple photo-detectors. It may be connected via wire or wireless communication link to the computer. In other embodiments the object may be an optical source or a retro reflector.

Figure 1A:
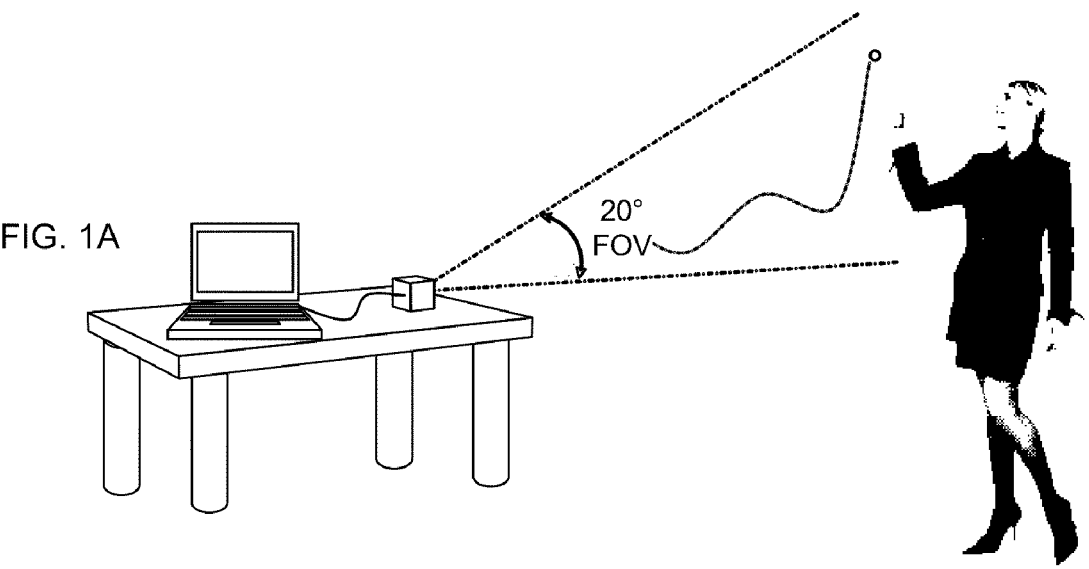
FIGS. 1A-1B illustrate the application or problem being solved by an embodiment of the present invention.
Figure 1B:
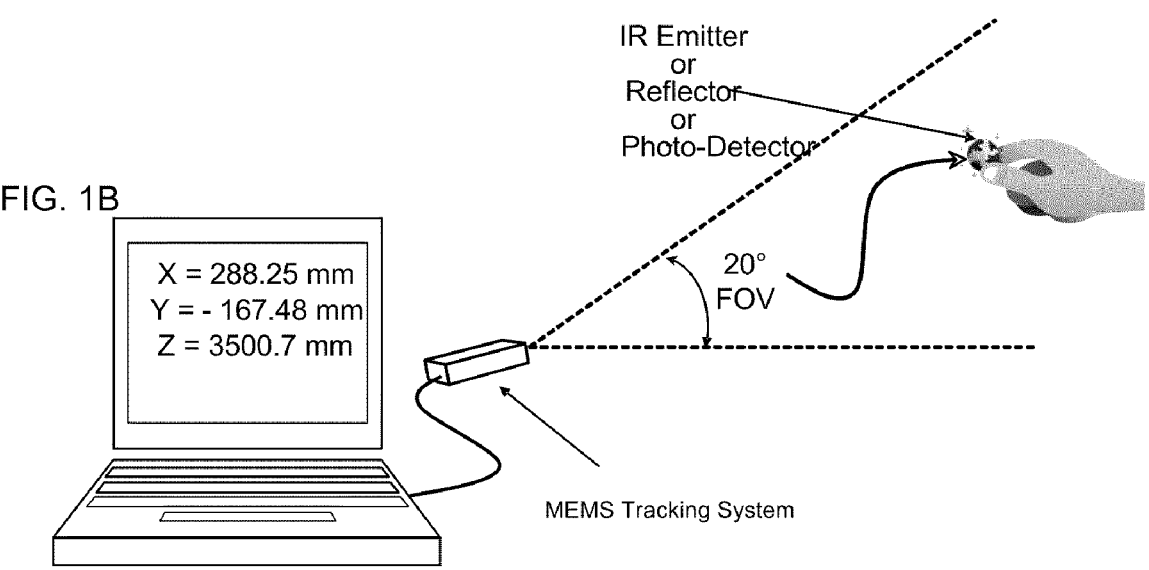

Several beam-steering based techniques may be used to track an object inside a conic volume. For example, as depicted in FIG. 1A and FIG. 1B, two laser beams may be scanned by two MEMS mirrors into a common volume. The MEMS mirrors are capable of scanning about two axes. Examples of suitable MEMS mirrors are described, e.g., in U.S. Pat. No. 7,295,726, US Patent Application Publication number 20080061026, U.S. patent application Ser. No. 11/465,835, and U.S. Provisional Patent Application No. 60/526,510, the contents of all four of which have been incorporated herein by reference above.

Figure 2A:
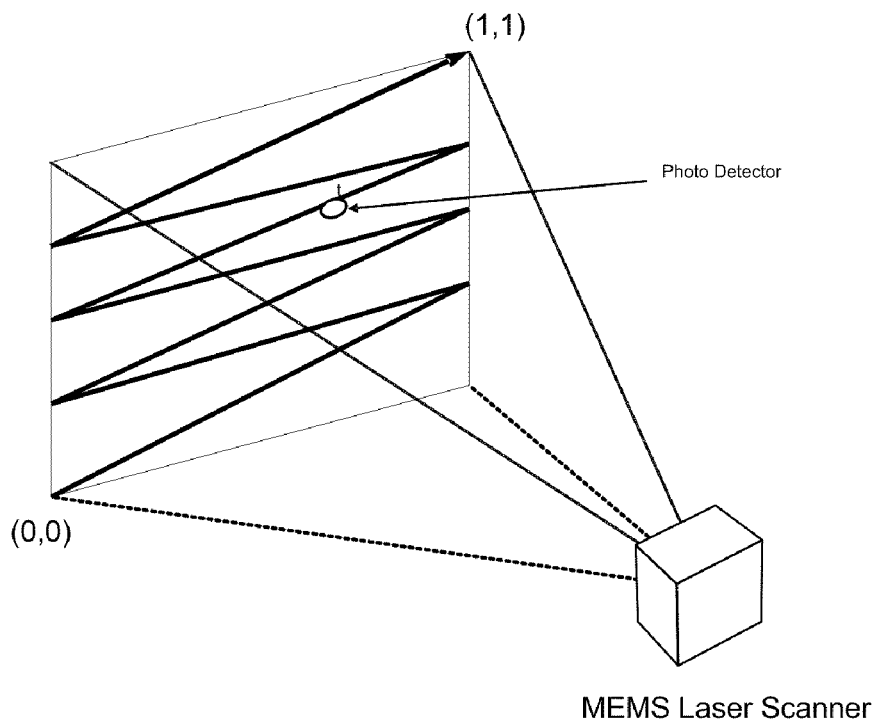
FIG. 2A depicts an optical beam-steering system scanning a laser beam in a rastering pattern in 3D space in accordance with an embodiment of the invention.

FIG. 2A depicts an optical beam-steering system scanning a laser beam in a rastering pattern in 3D space in accordance with an embodiment of the invention. The pattern begins from an angular position (0, 0) and terminates at position (1, 1) in normalized co-ordinates. In this example, light from one or more sources, e.g., lasers proximate the scanners, is deflected into the scanning volume. When a beam passes over an object which is or includes a photo-detector, the photo-detector will produce a signal which can allow the scanning system to determine its angular location with reference to the scanning system.

Figure 2B:
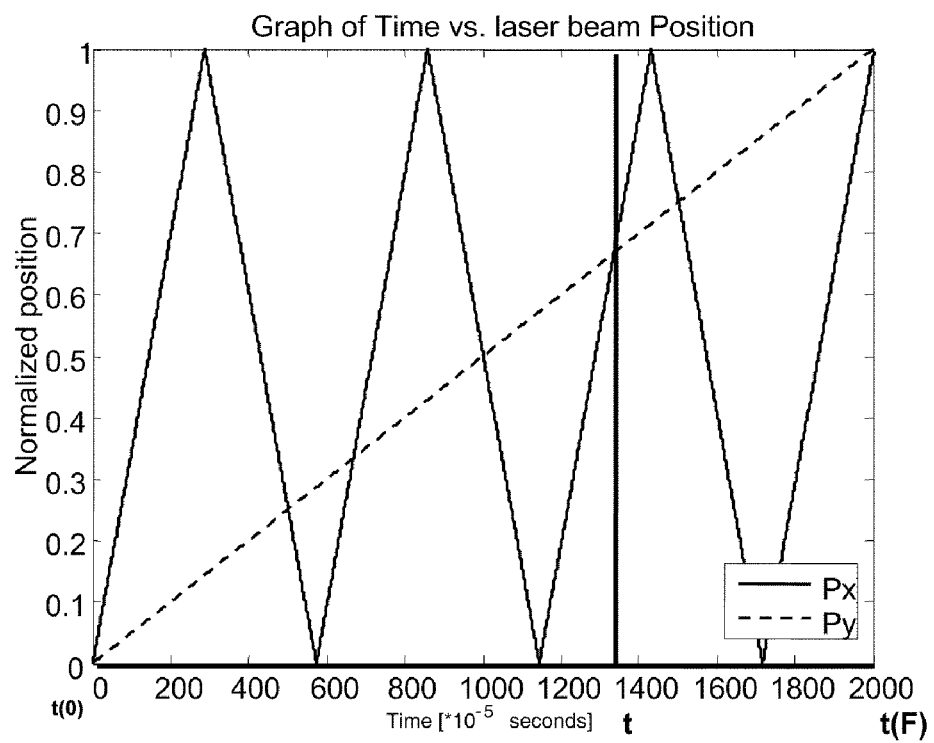
FIG. 2B is a graph showing an example of determining angular location of photo-detector with reference to scanning system described in FIG. 2A.

The graph depicted in FIG. 2B shows an example of determining angular location of photo-detector with reference to scanning system described in FIG. 2A. The angular position of beam in x- and y-axis is shown. The raster as shown in FIG. 2B has a continuously increasing vertical (y-axis) position (ramp function and zigzag pattern in x-axis (triangular wave pattern.) At the time when the beam crosses the photo-detector, the photo-detector will produce a detection signal. Due to the known (synchronous) time of signal detection with respect to the time of scan's beginning from position (0, 0); the system can determine the angular position of the photo-detector within one such scan.

The laser beam may be purposely made divergent so that it will cover a larger volume in raster-scanning and such that it will not leave any segments within that volume where the object can remain undetected.

Figure 3:
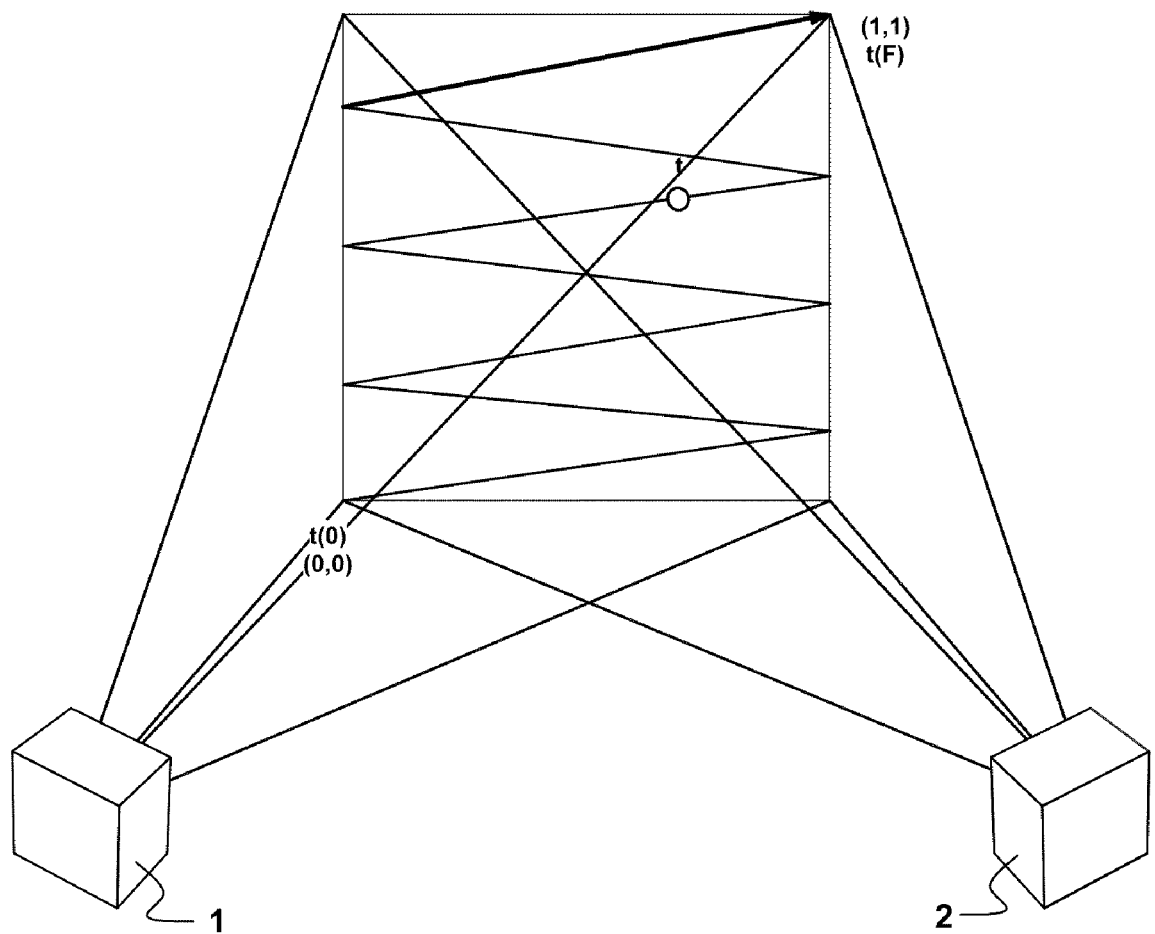
FIG. 3 depicts an embodiment in which two beam-steering systems are pointed to cover some shared volume with their respective scanning optical beams.

FIG. 3 depicts an embodiment in which two beam-steering systems, e.g., as described with respect to FIG. 2A and FIG. 2B, are pointed to cover some shared volume with their respective scanning optical beams. In this case the photo-detector produces a detection signal both when the beams from scanner system 1 beam passes over it as well as when the beam from scanner system 2 passes over it. Ambiguity as to which beam has passed over the photo-detector may be resolved either through time-multiplexing by scanning one system at a time (turning a beam on and off for each system,) or in wavelength or modulation (coding) differentiation.

Figure 4:
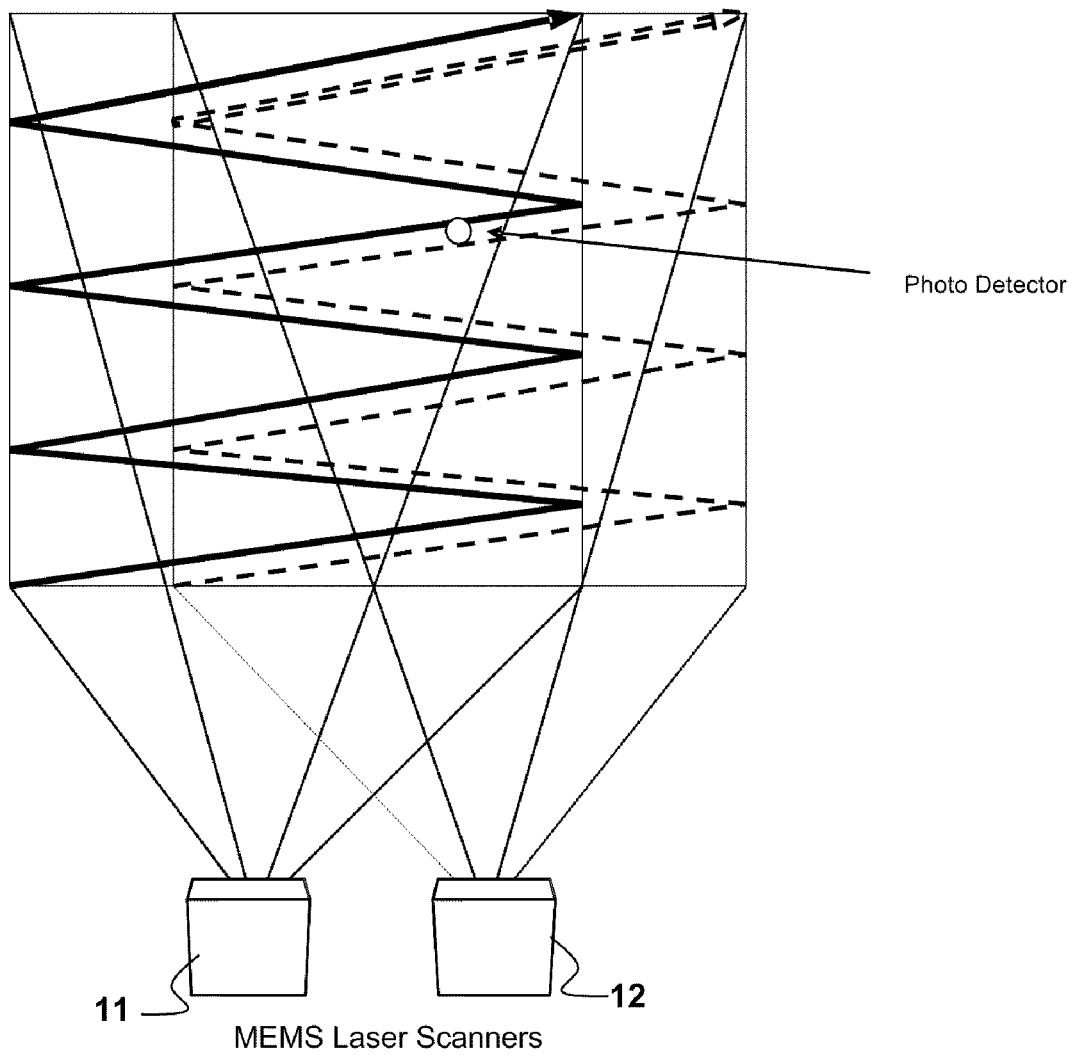
FIG. 4 depicts an embodiment of an optical tracking system in which two scanning systems pointed in the same direction but displaced laterally by a known distance (in x.) in accordance with an embodiment of the present invention

FIG. 4 depicts an embodiment of an optical tracking system in which two scanning systems 11, 12 pointed in the same direction but displaced laterally by a known distance along the x-direction. In this example, each scanning system is scanning a beam of a different wavelength. Thus the photo-detector (or multiple and co-incidental photo-detectors) can distinguish which scanner's beam it is detecting. Because the two scanning systems are laterally displaced the photo-detector is positioned at relatively different angles with respect to each scanning system's co-ordinate system. Therefore when the detector produces a signal due to a beam from one of the scanners passing over the detector, the respective scanner system will obtain angular co-ordinates which are different from the other. The combination of the two sets of obtained angular co-ordinates can then be used to obtain a linear position of the photo-detector in 3D space, such as e.g. X, Y, Z co-ordinates in meters. This spectroscopic method of obtaining distance information and overall 3D position information is similar to human vision.

Figure 5:
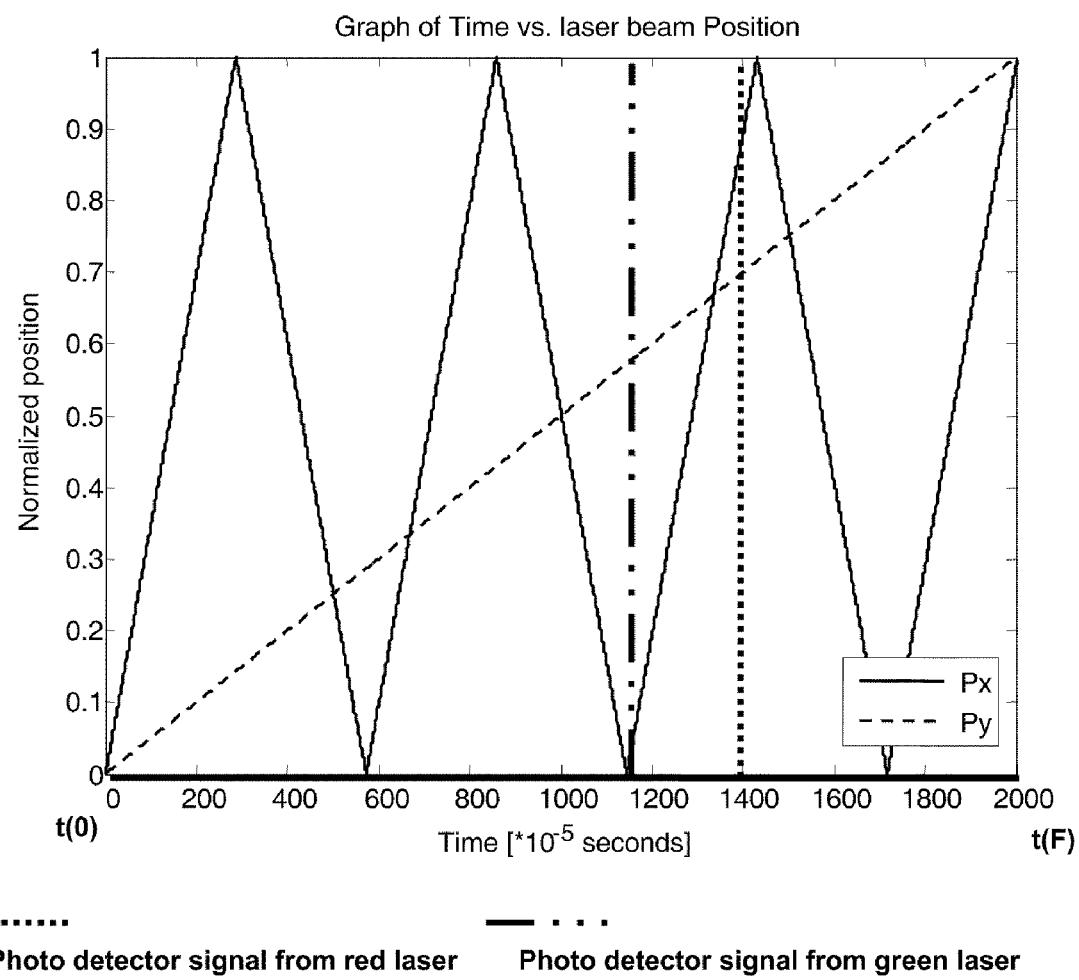
FIG. 5 is a graph showing an example of determining angular location of photo-detector with reference to two scanning systems described in FIG. 4.

FIG. 5 is a graph showing an example of determining angular location of photo-detector with reference to two scanning systems described in FIG. 4. Angular position of beam in x- and y-axis is shown. The raster as shown in FIG. 4 has a continuously increasing vertical position (ramp function) and zigzag pattern in x-axis (triangular wave pattern.) Both systems have such a raster but due to their displaced positions relative to each other and, therefore, relative position to the object (e.g., the photo-detector,) the photo-detector produces a signal for each system at different times. At the time when the beam from system 11 crosses the photo-detector, the photo-detector will produce a first detection signal. At the time when the beam from system 12 crosses the photo-detector, the photo-detector will produce a second distinguishable detection signal. Due to the known (synchronous) time of signal detection with respect to the time of scan's beginning from position (0, 0); the system can determine the angular position of the photo-detector within one such scan. Two sets of angular positions are therefore obtainable, and the combination of all these acquired angles is used to obtain a true 3D position, e.g., in terms of Cartesian coordinates X, Y, and Z.

By way of example, and not by way of limitation, the X and Y axes of both MEMS devices may be driven by separate channels of a 16-bit FPGA system. They achieve angle (negative and positive) maxima $(-\theta_{max}, +\theta_{max})$ when the system sends $-K$ to $+K$ to its output DAC, where $K=2^{15}-1$. The MEMS devices may be calibrated to provide $\theta_{max}=10°$, giving a total scan angle of 20°. When a first MEMS device successfully tracks the target, the FPGA system records the angle of the device's x-axis and y-axis in terms of open-loop output values $O_{X1}$ and $O_{Y1}$. The second MEMS device provides knowledge of its open-loop angles $O_{X2}$ and $O_{Y2}$. The two MEMS devices are level in y but spaced a known distance d in x. Therefore when both devices are tracking an object they see nearly identical Y readings $O_{Y1}$ and $O_{Y2}$, but due to motion parallax the X readings may be different depending on the distance of the object. The X readings may be utilized to obtain a true distance of the object to the origin (a point directly between the two micromirrors) as:

$$Z = \frac{d \cdot K}{\tan(\theta_{max})} \cdot \frac{1}{(O_{X1} - O_{X2})}.$$

With Z known, X and Y are found from known parameters and by averaging from two devices' readings:

$$X = (O_{X2} + O_{X1}) \cdot Z \cdot \tan(\theta_{max})/(2K) = \frac{d}{2} \frac{(O_{X2} + O_{X1})}{(O_{X1} - O_{X2})}$$

$$Y = (O_{Y2} + O_{Y1}) \cdot Z \cdot \tan(\theta_{max})/(2K) = \frac{d}{2} \frac{(O_{Y2} + O_{Y1})}{(O_{Y1} - O_{Y2})}.$$

Figure 6:
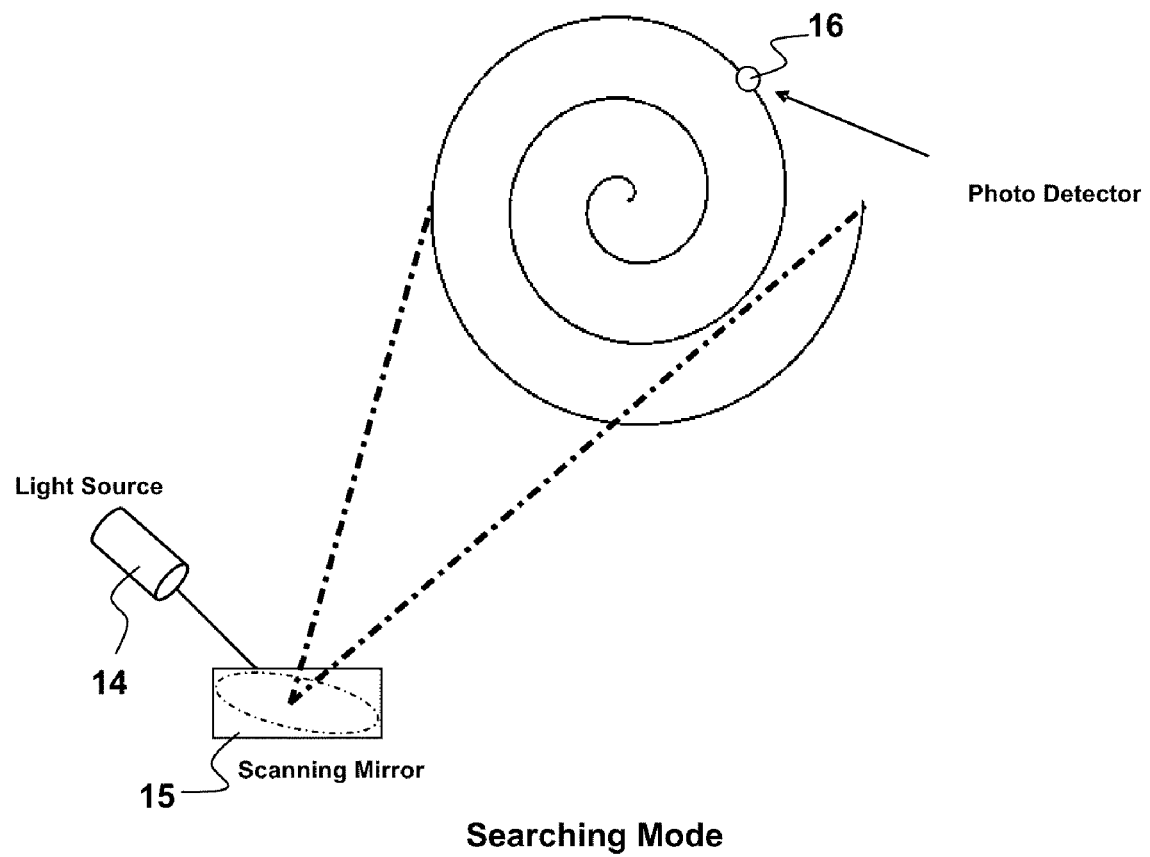
FIG. 6 is a schematic diagram illustrating an optical scanning system operating in a searching mode.

According to embodiments of the present invention, a dual scanner optical tracking system of the type described herein may operate in both a searching mode and a scanning mode. By way of example, and not by way of limitation, FIG. 6 is a schematic diagram illustrating an optical scanning system operating in a searching mode. In this example, the MEMS scanning system includes a light source 14 and scanning mirror 15 that produces a spiraling scan of an optical beam to illuminate a photo-detector 16 at a measurable time. When the photo-detector 16 produces a signal the system can determine the detector's angular position by the knowledge of the portion of the spiral pattern where the signal was obtained.

Figure 7:
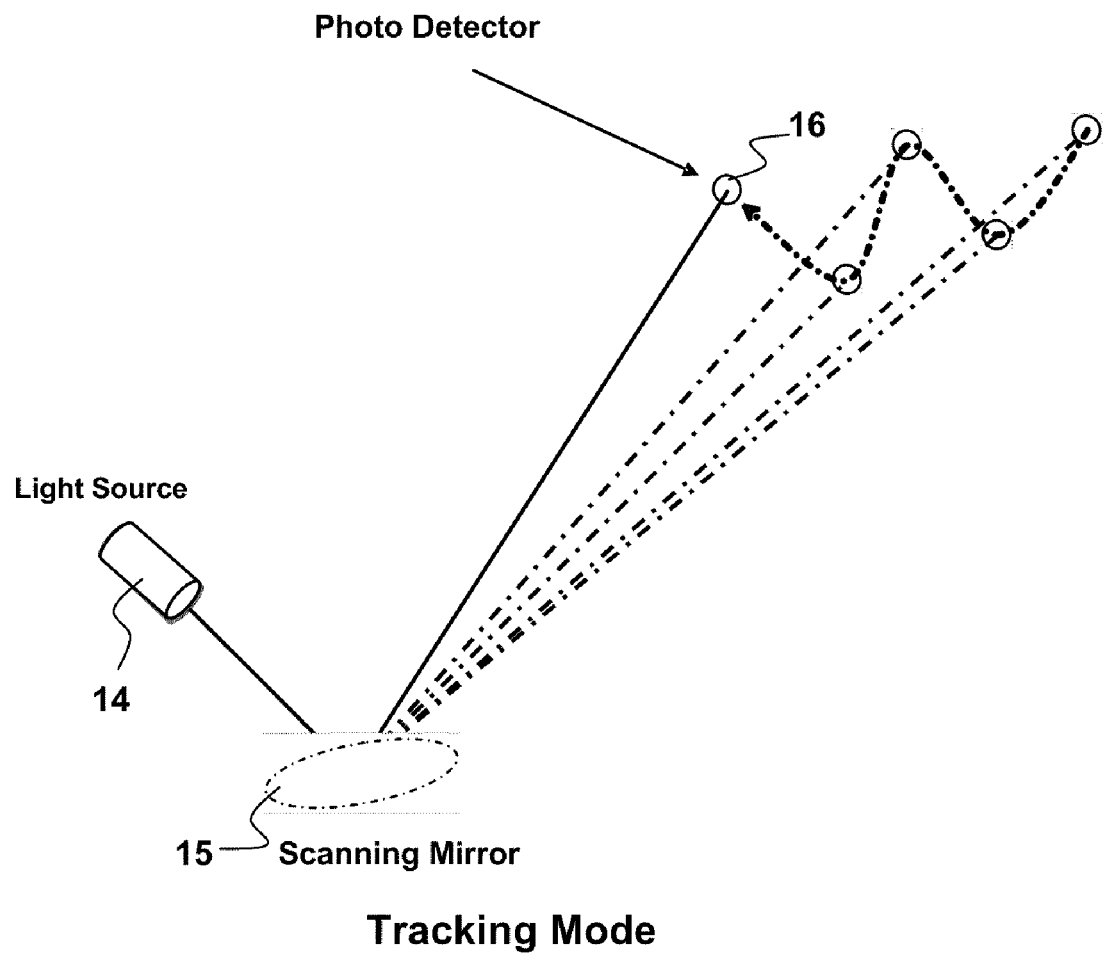
FIG. 7 is a schematic diagram illustrating an optical scanning system operating in a tracking mode.

FIG. 7 is a schematic diagram illustrating an optical scanning system operating in a tracking mode. The operation of an optical scanner system, e.g., as shown in FIG. 1A-FIG. 6, can be used to obtain angular position and overall 3D position of object. On the other hand such rastering or spiral-scanning operation can be used only to initially search the position of the detector. After the detector's initial position is found by covering the entire volume with an optical beam, the system can enter a tracking mode in which the rastering of volume is terminated and the system only maintains the optical beam on the object at all times. This tracking can be done in various ways. For example, the photo-detector 16 may provide such a correction signal to the system if it is e.g. a quadrant detector with four photo-diodes. Alternatively, the scanning system may use a dithering algorithm or a mutation algorithm to maintain a small search area around the photo-detector such that it can continue to point toward the detector as the detector moves in 3D volume.

Figure 8A:
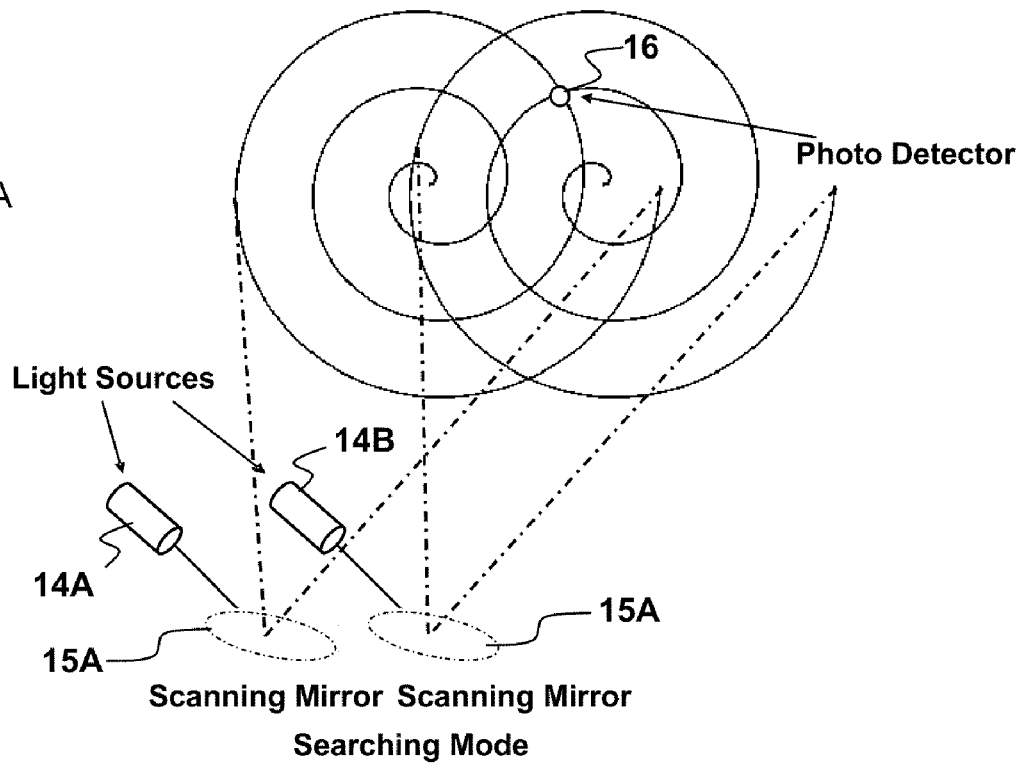
FIG. 8A is a schematic diagram illustrating a dual scanner system operating in a searching mode in accordance with an embodiment of the present invention.
Figure 8B:
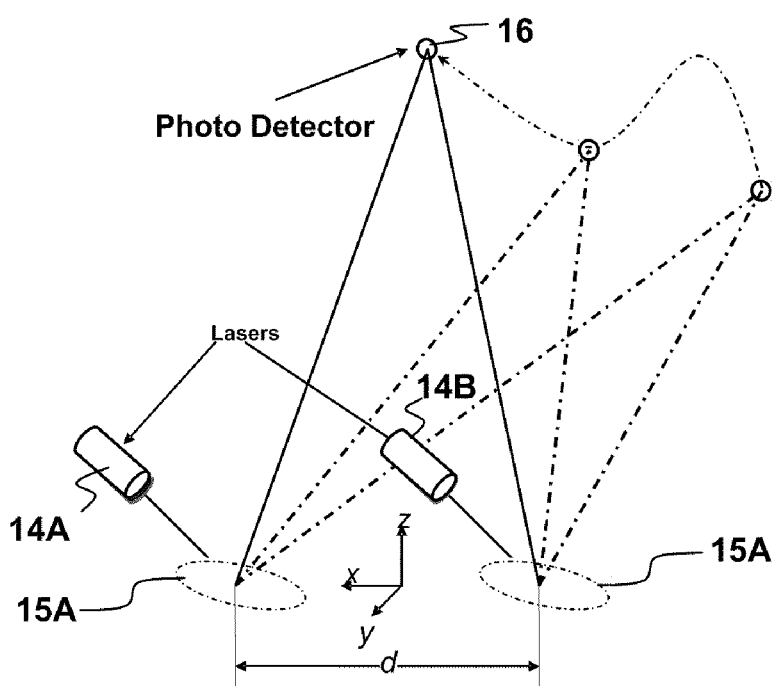
FIG. 8B is a schematic diagram illustrating a dual scanner system operating in a tracking mode in accordance with an embodiment of the present invention.

FIG. 8A schematically illustrates a dual scanner system operating in a searching mode in accordance with an embodiment of the present invention. Two scanning systems each comprised of an optical source 14A,14B (e.g. laser) and a scanning mirror device 15A, 15B both in spiral search mode. Each respective system is in search mode until the photo-detector 16 provides a signal. At that time the current position of the detector is obtained and may be used for further tracking. Each sub-system must multiplex with the other as described above, e.g. by time-multiplexing (one beam is on at a time.) In FIG. 8B a dual scanner system operating is in a tracking mode in accordance with an embodiment of the present invention. Two scanning systems are now in tracking mode and both repeatedly obtain angular position of the detector 16 with respect to their own co-ordinate systems' origins.

Figure 9A:
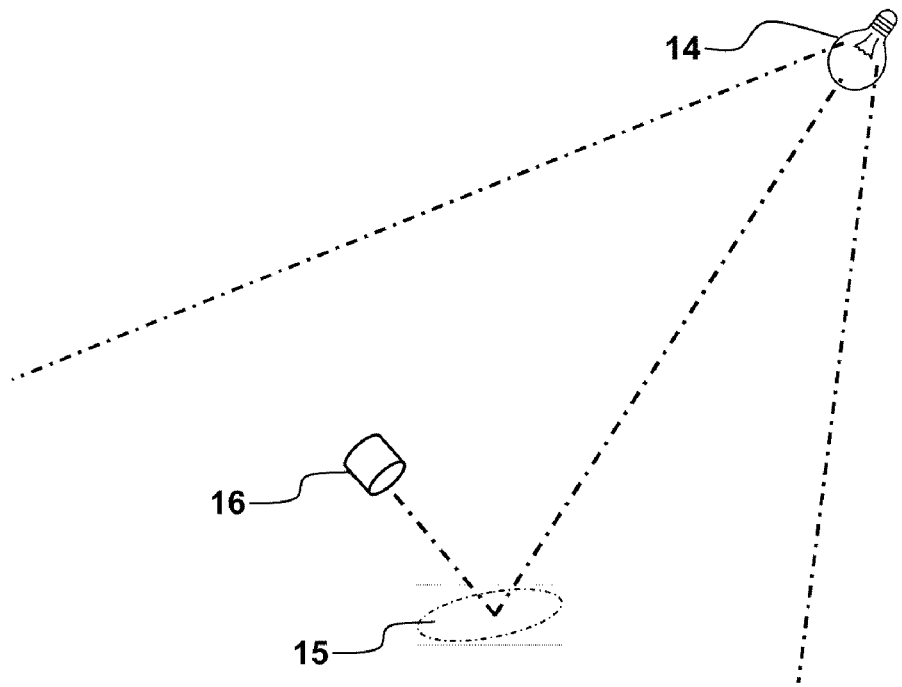
FIG. 9A is a schematic diagram illustrating a single scanner searching for and tracking a light source.
Figure 9B:
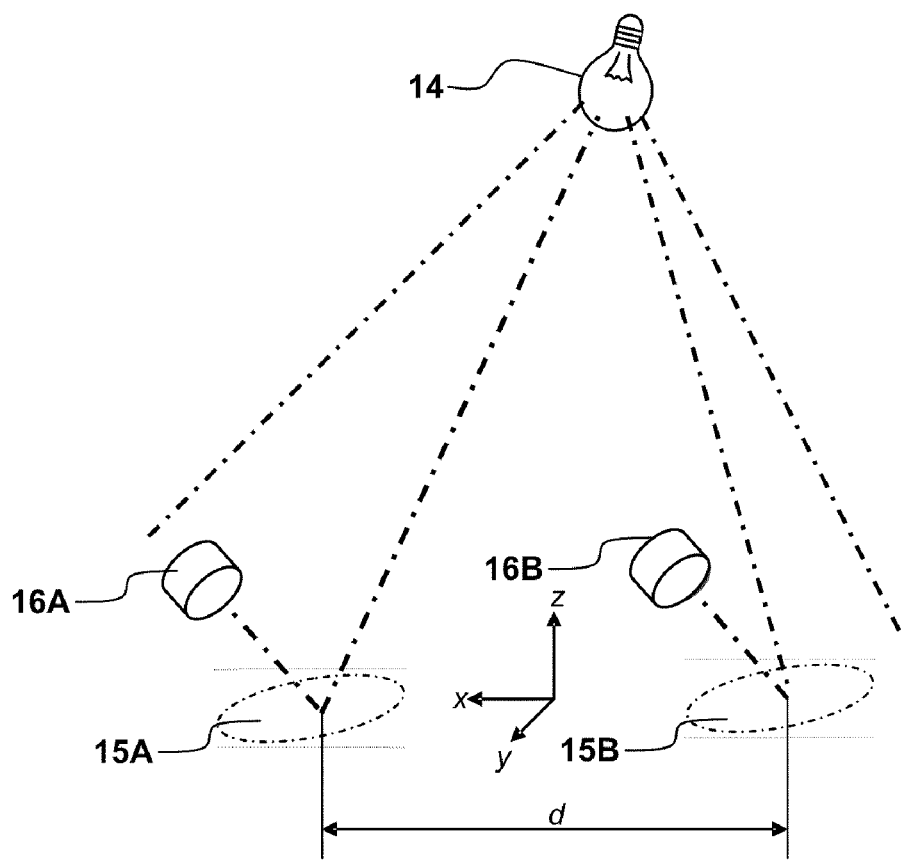
FIG. 9B is a schematic diagram illustrating use of a dual scanner optical system to search for and track a light source in accordance with an embodiment of the present invention.

In some embodiments, the dual scanner system may be modified to track a light source 14 that either is the object or is attached to the object. By way of example, FIG. 9A schematically illustrates use of a single scanner searching for and tracking a light source 14. In this case, light from the source is deflected by the scanning mirror 15 towards a detector 16 when the mirror 15 is pointed at the source 14. Rotational angles of the mirror 15 at the time that the detector 16 detects light from the source 14 may be used to determine a vector pointing toward the target. As shown in FIG. 9B a dual scanner optical system having scanners 15A, 15B and corresponding detectors 16A, 16B may be used to search for and track a light source 14 in accordance with an embodiment of the present invention. In this case, each scanner can be used to determine a vector pointing at the source. A slight separation between the two scanners 15A, 15B allows for determination of a distance from the scanners to the source 14.

Figure 10:
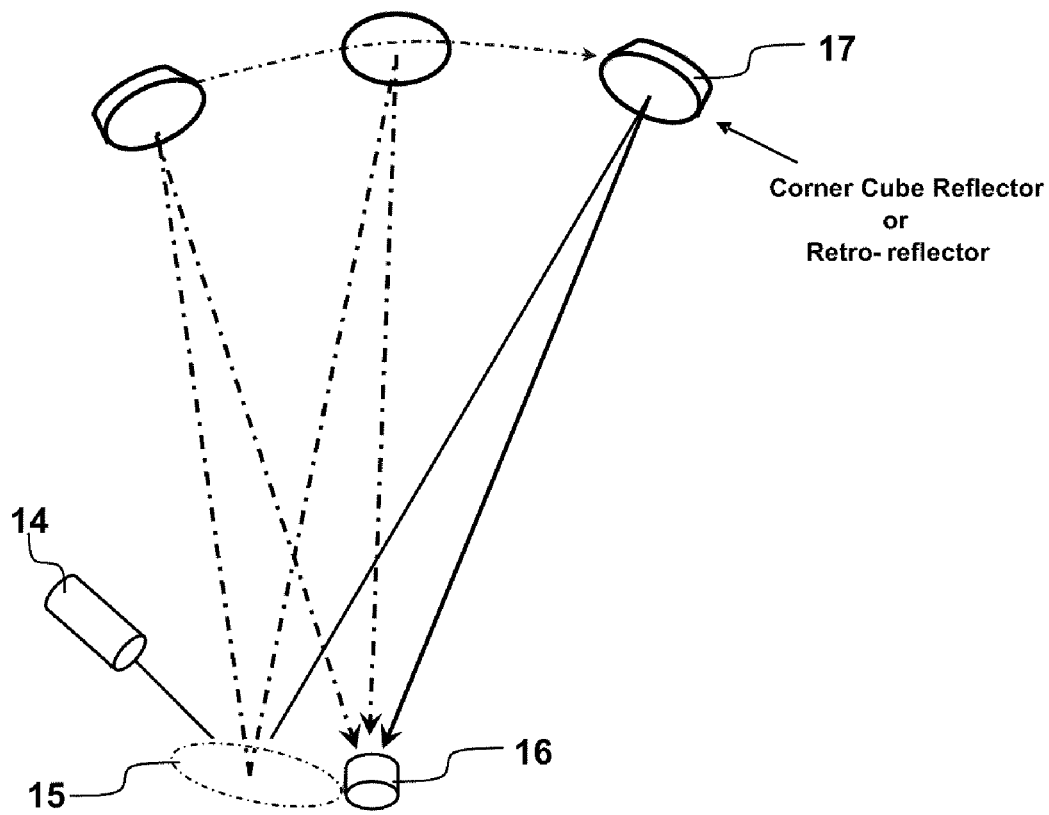
FIG. 10 is a schematic diagram illustrating tracking of a reflective object with a photo-detector in close proximity to a MEMS mirror.

In another alternative embodiment, the above-described system may be adapted to reflectively track an object. For example, FIG. 10 schematically illustrates tracking of a reflective object with a photo-detector in close proximity to a MEMS mirror. In a setup very similar to that depicted in FIG. 9A, a photo-detector 16 may be placed in close proximity with the MEMS mirror 15. The object 17 being searched in the 3D volume may include a retro-reflector ("cats eye") or a corner-cube reflector (both of which have been used in experiments.) When the scanning system (with the MEMS mirror 15) illuminates the target, a reflected beam is returned back to approximately the same position of the scanning system. The photo-detector 16 will therefore detect the reflected optical signal and the rest of search or tracking methodology follows as in previous examples. This method has the advantage of not requiring a wire/communication link to the object being tracked and synchronous communication to a photo-detector near or on the object. The object 17 just needs to include a retro-reflective body. To obtain the stereoscopic information and therefore the three-dimensional (e.g., X, Y, and Z) location of the object, 2 photo-detectors may be placed in close proximity with two MEMS mirrors, in two separate scanning systems as described in earlier examples. In this manner both devices can simultaneously illuminate the target as their respective reflections return to appropriate and separate receivers and are therefore fully independent. This method has the advantage of not requiring a wire/communication link to the object being tracked, as the sensors are at the MEMS system location.

Figure 11:
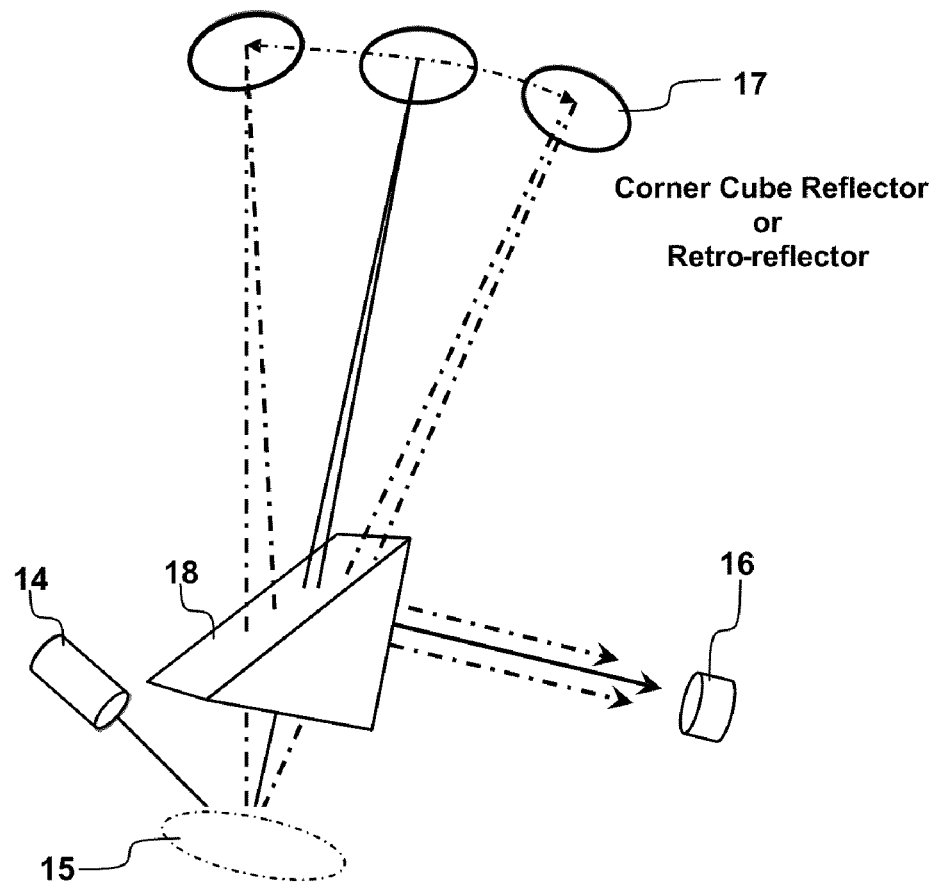
FIG. 11 is a schematic diagram illustrating a variation on the system of FIG. 10 in which a beam sent out into the 3D volume is separated from returning beam from the retroreflector by a beam-splitter.

FIG. 11 is a schematic diagram illustrating a variation on the system of FIG. 10 in which a beam sent out into the 3D volume is separated from returning beam from the retro-reflector 17 by a beam-splitter 18. Such a system may include polarized optical beams, polarization rotating elements and a beam-splitter. In this way the photo-detector 16 may be placed further away from the scanning mirror 15 while still receiving a significant portion of the reflected optical energy.

Figure 12A:
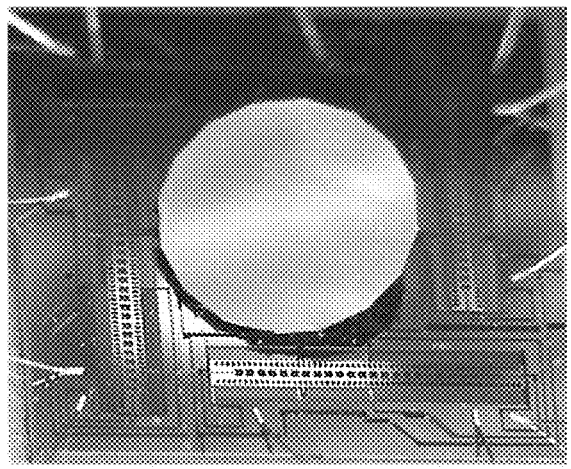
FIG. 12A is a photograph of a gimbal-less dual-axis 4-quadrant devices used in conjunction with an embodiment of the invention.
Figure 12B:
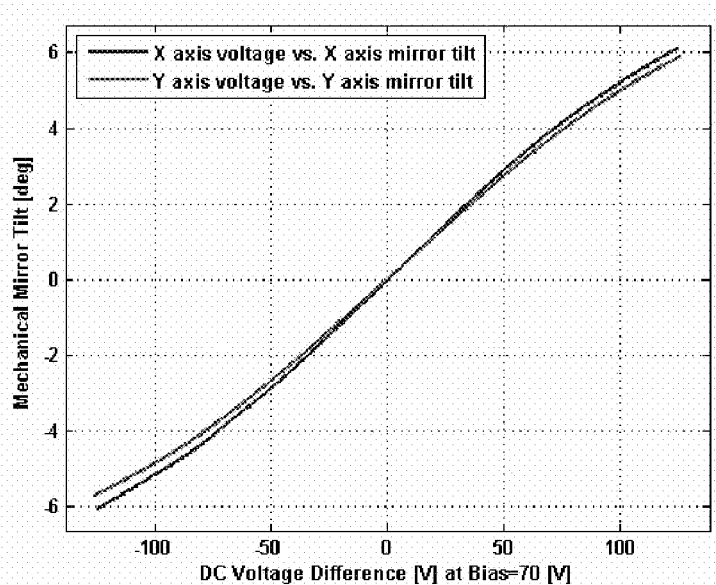
FIG. 12B is a graph of Voltage vs. Mechanical tilt angle measurements of a typical 4-quadrant device of the type shown in FIG. 12A linearized by a 4-channel amplifier driving scheme.
Figure 12C:
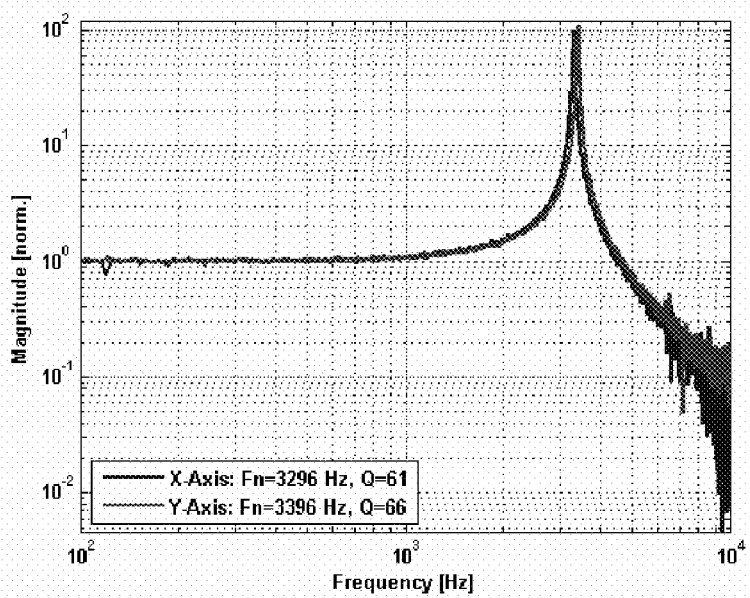
FIG. 12C is a graph of small-signal characteristics of fast devices with 0.8 mm mirror used in a setup of the type shown in FIG. 1*b*, where larger aperture size is not required.

An example of a dual beam scanner object position location and tracking system is depicted in FIGS. 12A-12C. FIG. 12A is a photograph of a gimbal-less dual-axis 4-quadrant devices used in conjunction with an embodiment of the invention. This particular device is capable of a mechanical tilt from −8° to +8° on both axes. The device shown has a 2 mm mirror, this larger aperture being more suitable for the setup of the type shown in FIG. 9(b). FIG. 12B is a graph of Voltage vs. Mechanical tilt angle measurements of a typical 4-quadrant device of the type shown in FIG. 12A linearized by a 4-channel amplifier driving scheme. FIG. 12C is a graph of small-signal characteristics of fast devices with 0.8 mm mirror used in a setup of the type shown in FIG. 8A and FIG. 8B, where larger aperture size is not required.

FIG. 13A is a photograph of an optical tracking system in accordance with an embodiment of the invention that utilizes two MEMS scanners and amplifiers. In this example, the devices are d=75 mm apart and aimed in the same direction. Each amplifier in the background is driven by an FPGA closed-loop controller. FIG. 13B is a 2 second long exposure photograph of quad-detector operating in a tracking mode. In this case laser spots from both scanners are on the detector, and both devices successfully track the target. FIG. 13C is a graphical user interface (GUI) screen shot capture showing the measured four degrees of freedom of the detector: position X [mm], position Y [mm], position Z [mm], and tilt of the quad-detector.

Figure 14A:
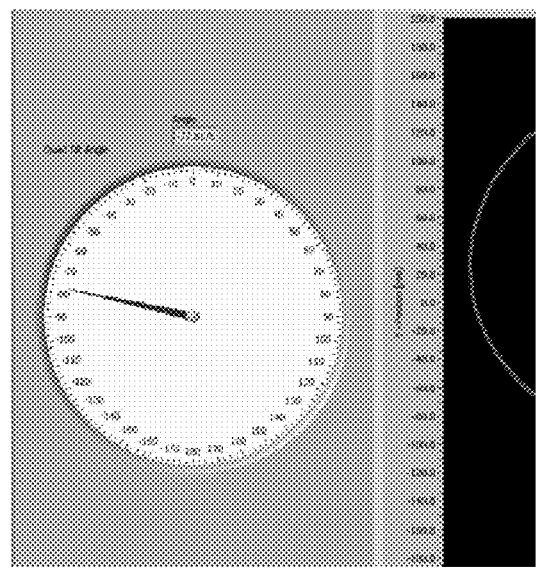
FIG. 14A is a portion of a screen shot of a dial showing rotation of the detector.

FIG. 14A is a portion of a screen shot of a dial showing rotation of the detector. When the photo-detector is a multi-element type of photo-detector such as PSD (array) or a quadrant photo-detector (e.g., having 4 elements,) the scanning system may obtain information about the orientation of the detector. In this example, the dial shows rotation of the detector from −180 degrees to +180 degrees which is directly measured by this method.

Figure 14B:
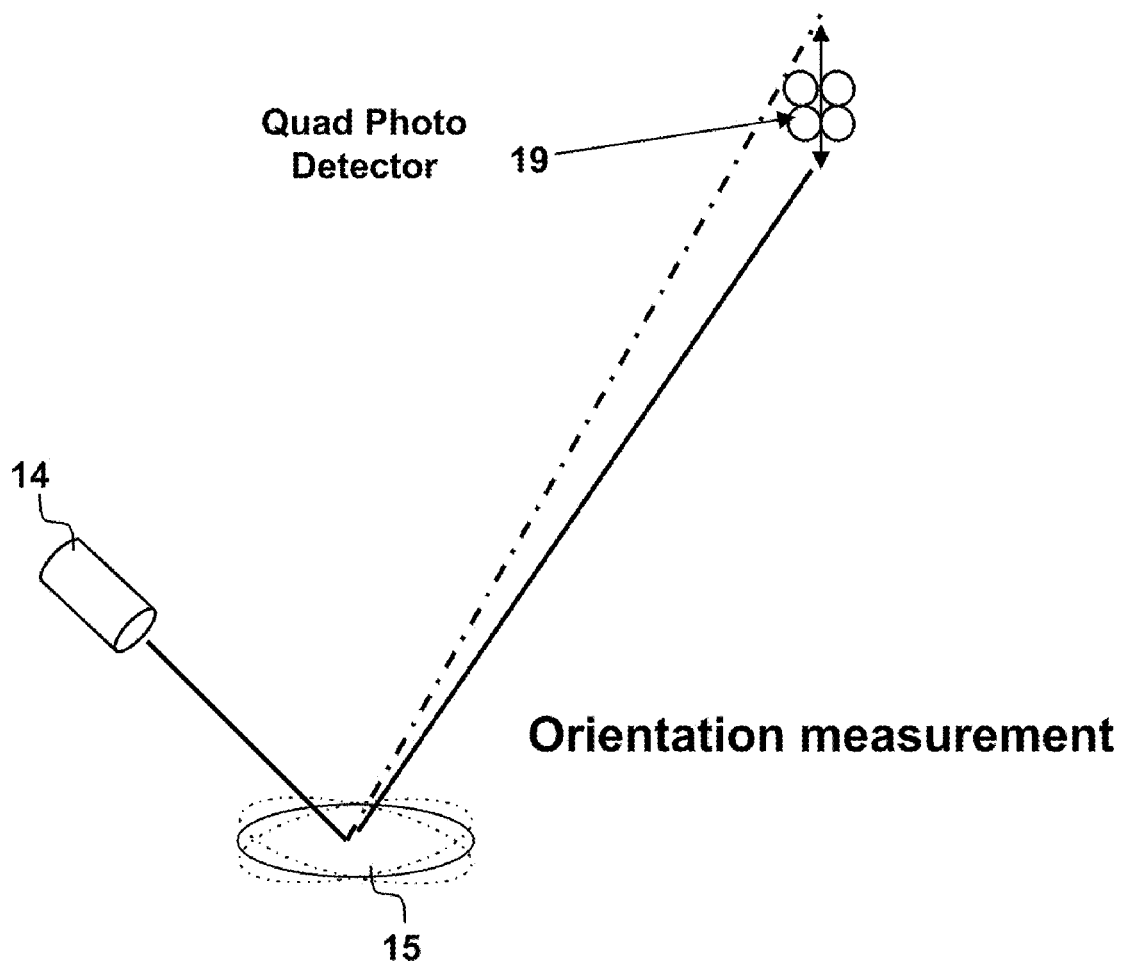
FIG. 14B is a schematic diagram illustrating a method of determining and tracking and object's position and orientation in accordance with an embodiment of the present invention.

FIG. 14B is a schematic diagram illustrating a method of object position location tracking in accordance with an embodiment of the present invention. The tracking beam follows a quad photo-detector 19 by previously described methods or any other methods available in the art. On top of the tracking waveform a small dither signal may be added, which can be in a specific known direction such as e.g. vertical line (up-down movement.) When the signal is monitored from the quad photo-detector 19 which is placed without rotation (in its normal position,) the up-down movement of the optical beam will show up as up-down measurements on the quad-detector 19. However if the quad-detector 19 is rotated the up-down beam movements will be projected both on the x-axis and the y-axis of the detector 19. Therefore from the two projections simple trigonometry allows one to obtain the orientation of the photo-detector 19. We can then use this orientation information to properly interpret quad-detector data and appropriately guide the tracking beam even when the detector is rotated by 90 degrees or 180 degrees.

RESULTS

MEMS devices in accordance with embodiments of the present invention provided pointing precision greater than or equal to the DAC's 16-bit resolution, and therefore the overall system results all demonstrated this 16-bit limitation. When a target object was not moving, no single digit of X, Y, Z was changing. Movements of 1 mm on an optical-bench micrometer were easily recorded at a distance of 5 meters. With the loop-gain and bandwidth capable of tracking full-speed human hand motion, the system provides position information at up to 5 meter distance with less than or equal to 20 μm precision on the X and Y axes (up, down, left, right,) and precision on the depth (Z-axis) from 10 μm to 1.5 mm, depending on the distance. Precision can be greatly increased with slower tracking settings and lower loop-gain in different applications.

Embodiments of the invention allow for very high resolution in three-dimensional position, e.g., greater than 10-bit, perhaps 16-bit resolution or more, on a very fast time scale, e.g., greater than 10 kilohertz bandwidth with a relatively simple and inexpensive system. At a 10-kilohertz bandwidth the three-dimensional position of the target object can be measured once every 100 microseconds.

PUBLICATION REFERENCES

[1] J. Brophy-Warren, "Magic Wand: How Hackers Make Use Of Their Wii-motes," The Wall Street Journal, Apr. 28, 2007.
[2] P. Arcara, et al, "Perception of Depth Information by Means of a Wire-Actuated Haptic Interface," Proc. of 2000 IEEE Int. Conf. on Robotics and Automation, April 2000.
[3] A. Cassinelli, et al, "*Smart Laser-Scanner for 3D Human-Machine Interface*," Int. Conf. on Human Factors in Computing Systems, Portland, Oreg., Apr. 2-07, 2005, pp. 1138-1139.
[4] S. Perrin, et al, "Laser-Based Finger Tracking System Suitable for MOEMS Integration," Image and Vision Computing, New Zealand, 26-28 Nov. 2003, pp. 131-136.
[5] V. Milanović, et al, "Gimbal-less Monolithic Silicon Actuators For Tip-Tilt-Piston Micromirror Applications," IEEE J. of Select Topics in Quantum Electronics, vol. 10 (3), June 2004.
[6] F. Blais, J.-A. Beraldin, S. El-Hakim, and L. Cournoyer, "Comparison of Pose Estimation Methods for a 3D Laser Tracking System using Triangulation and Programmetry Techniques," SPIE Proceedings, Electronic Imaging 2001, Videometrics and Optical Methods for 3D Shape Measurement VII, San Jose, Calif. Jan. 21-26, 2001.
[7] V. Milanović, W. K. Lo, "Fast and High-Precision 3D Tracking and Position Measurement with MEMS Micromirrors", 2008 IEEE/LEOS International Conference on Optical MEMs and Nanophotonics, ISBN: 978-1-4244-1917-3, pp 72-73, Freiburg, Germany, 11-14 Aug., 2008.

The above cited publication references are incorporated herein by reference for all purposes.

Embodiments of the invention allow for real-time fast-motion tracking of an object in a 3D volume, while obtaining its precise XYZ co-ordinates may be achieved through the use of MEMS micromirror scanning systems. In one embodiment, two separate scanning MEMS micromirror sub-systems may track an object in a 20 kHz closed-loop. Certain embodiments are capable of tracking full-speed human hand motion provides position information at up to 5 m distance with 16-bit precision, or precision less than or equal to 20 μm on the X and Y axes (up/down, left/right,) and precision on the depth (Z-axis) from 10 μm to 1.5 mm, depending on distance.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. In the claims that follow, the word "or" is to be interpreted as an inclusive "or"; e.g., A or B is satisfied if either A or B individually is present and alternatively satisfied if both A and B are present. The appended claims are not to be interpreted as including means-plus-function limitations, unless such a limitation is explicitly recited in a given claim using the phrase "means for."

What is claimed is:

1. A system for optically locating and tracking an object in three dimensions and measuring a position in three dimensions, comprising:
    two or more optical scanners, each optical scanner having a reflector mounted to a two-dimensional actuator configured to control a tilt of the reflector about a first axis and a second axis;
    one or more optical detectors responsive to radiation from one or more optical sources; and
    a controller coupled to the one or more optical detectors and the first and second optical scanners,
    wherein the controller is configured to determine from one or more detection signals from the one or more optical detectors whether a given reflector of a given scanner is aligned to provide an optical path between the one or more optical sources and the one or more optical detectors, wherein the optical path originates or terminates at the object; and
    wherein the controller is configured to determine a position of the object in three dimensions from control signals to the two-dimensional actuators of each of the two or more optical scanners obtained when each reflector is aligned to provide the optical path between the one or more optical sources and the one or more optical detectors,
    wherein the control signals determine a tilt of each reflector about its first and second axes.

2. The system of claim 1 wherein the one or more optical sources include two or more distinct optical sources, wherein each optical source is optically coupled to a different one of the two or more optical scanners and wherein the one or more optical detectors includes an optical detector that is the object or is configured to be attached to the object.

3. The system of claim 2 wherein the two or more distinct optical sources are distinguished by different modulation of radiation from the two or more distinct optical sources.

4. The system of claim 2 wherein the two or more distinct optical sources are distinguished by different wavelengths of radiation from the two or more distinct optical sources.

5. The system of claim 2 wherein the two or more distinct optical sources are distinguished by time multiplexing of radiation from the two or more distinct optical sources.

6. The system of claim 2 wherein the detector is a detector array having multiple detector elements.

7. The system of claim 6 wherein the controller is configured to determine an orientation of the detector from signals from the multiple detector elements.

8. The system of claim 1 wherein the one or more optical sources includes an optical source that either is the object or is configured to be attached to the object and wherein the one or more optical detectors includes two or more optical detectors wherein each optical detector is optically coupled to a different one of the two or more optical scanners.

9. The system of claim 1 wherein the two or more scanners, one or more optical sources, one or more optical detectors and the controller are configured such that the controller can determine angles of tilt of each reflector about its first and second axes with a resolution of greater than 10 bits.

10. The system of claim 1 wherein the two or more scanners, one or more optical sources, one or more optical detectors and the controller are configured such that the controller can determine the three-dimensional position of the object at a bandwidth of 10 kilohertz or more.

11. The system of claim 1 wherein the controller is configured to provide control to the two-dimensional actuators of the two or more optical scanners.

12. The system of claim 11 wherein the controller is configured to scan the two or more optical scanners in a spiral pattern.

13. The system of claim 11 wherein the controller is configured to adjust a scan of the angles of the reflectors about their first and second axes in response to the one or more detection signals.

14. The system of claim 13 wherein the controller is configured to adjust an origin of a scan to correspond to a previous known position of the object.

15. The system of claim 1 wherein the two or more optical scanners include two or more MEMS optical scanners.

16. A method for optically locating and tracking an object in three dimensions and measuring a position in three dimensions, comprising:
   a) scanning a first reflector about a first axis and a second axis;
   b) scanning a second reflector about a third axis and a fourth axis;
   c) generating radiation with one or more optical sources;
   d) reflecting the radiation with the first and second reflectors while scanning the first and second reflectors;
   e) using one or more optical detectors to determine when the first and second reflectors provide first and second optical paths between the one or more optical sources and the one or more optical detectors, wherein the optical path originates or terminates at the object;
   f) determining values of the first and second angles of rotation of the first reflector with respect to the first and second axes at a time when the first reflector provides the first optical path;
   g) determining values of the third and fourth angles of rotation of the second reflector with respect to the third and fourth axes at a time when the second reflector provides the second optical path; and
   h) determining a position of the object in three dimensions from the values of the first, second, third and fourth angles.

17. The method of claim 16 wherein c) includes generating first and second distinct optical radiation signals and wherein the one or more optical detectors include an optical detector that is the object or is attachable to the object, and wherein the optical path terminates at the object.

18. The method of claim 17 wherein the detector is a detector array having multiple detector elements.

19. The method of claim 18, further comprising determining an orientation of the detector by from signals from the multiple detector elements.

20. The method of claim 16 wherein c) includes generating an optical signal with a source that either is the object or is attachable to the object, wherein the one or more detectors include first and second optical detectors respectively located proximate the first and second reflectors, and wherein the optical path originates at the object.

21. The method of claim 16 wherein a) and b) include scanning the first and second reflectors in spiral patterns.

22. The method of claim 16, further comprising adjusting the scanning of the first or second reflector in response to a determination that the first and second reflectors provide the first and second optical paths between the one or more optical sources and the one or more optical detectors.

23. The method of claim 22, wherein adjusting the scanning includes adjusting an origin of the scanning of the first or second reflector to correspond to a previous known position of the object.

24. The method of claim 22, wherein adjusting the scanning includes adjusting range of the scanning in response to the determination that the first and second reflectors provide the first and second optical paths.

25. A system for optically locating and tracking an object, comprising:
   an optical source configured to generate an optical beam;
   an optical scanner having a reflector mounted to a two-dimensional actuator configured to control a tilt of the reflector about a first axis and a second axis, wherein the scanner is configured to deflect the optical beam toward an object;
   and optical detector responsive to radiation from the optical source deflected by the object; and
   a controller coupled to the optical detector and the optical scanner,
   wherein the object has retro-reflective properties such that when the reflector is aligned to provide an optical path between the optical source and the object, the object reflects a portion of the radiation in the general direction of the reflector;
   wherein the detector is configured such that it does not obscure an optical path between the reflector and the object and wherein the detector is configured to receive a portion of the radiation that is reflected by the object in the general direction of the reflector;
   wherein the controller is configured to determine from one or more detection signals from the optical detector whether the reflector is aligned to provide an optical path between the optical source and the optical detector, wherein the detector is configured such that the optical path from the source to the detector does not intersect the reflector along a return portion of the optical path from the object to the detector; and wherein the controller is configured to determine a position of the object from control signals to the two-dimensional actuator of the optical scanner obtained when the reflector is aligned to provide the optical path between the one or more optical sources and the one or more optical detectors, wherein the control signals determine a tilt of each reflector about its first and second axes.

26. A method for optically locating and tracking an object, comprising:

a) scanning a reflector about a first axis and a second axis;
b) generating radiation with an optical source;
c) reflecting the radiation with the reflector while scanning the reflector;
d) using an optical detector to determine when the reflector provides an optical path between the optical source and the optical detector, wherein the optical path is deflected at the object, wherein the object has retro-reflective properties such that when the reflector is aligned to provide an optical path between the optical source and the object, the object reflects a portion of the radiation in the general direction of the reflector, wherein the detector is configured such that it does not obscure an optical path between the reflector and the object and wherein the detector is configured to receive a portion of the radiation that is reflected by the object in the general direction of the reflector, and wherein the optical detector is configured such that the optical path from the source to the optical detector does not intersect the reflector along a return portion of the optical path from the object to the detector;

f) determining values of the first and second angles of rotation of the reflector with respect to the first and second axes at a time when the reflector provides the optical path;

h) determining a position of the object from the values of the first and second angles.

* * * * *